United States Patent
Warke et al.

(10) Patent No.: US 7,031,400 B2
(45) Date of Patent: Apr. 18, 2006

(54) METHOD OF SELECTING A PCM MODEM SIGNAL CONSTELLATION IN RELATION TO CHANNEL IMPAIRMENTS

(75) Inventors: Nirmal C. Warke, Dallas, TX (US); Murtaza Ali, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 861 days.

(21) Appl. No.: 10/102,415

(22) Filed: Mar. 20, 2002

(65) Prior Publication Data

US 2002/0163972 A1    Nov. 7, 2002

Related U.S. Application Data

(60) Provisional application No. 60/279,864, filed on Mar. 30, 2001.

(51) Int. Cl.
  *H04L 27/04*  (2006.01)
  *H04B 17/00*  (2006.01)

(52) U.S. Cl. .................................. 375/295; 375/224

(58) Field of Classification Search ............ 375/219, 375/222, 316, 377, 224–227, 295; 379/93.01
See application file for complete search history.

(56) References Cited

U.S. PATENT DOCUMENTS

| | | | |
|---|---|---|---|
| 6,256,357 B1 * | 7/2001 | Oshima | 375/261 |
| 6,332,009 B1 * | 12/2001 | Olafsson | 375/358 |
| 6,553,535 B1 * | 4/2003 | Asada et al. | 714/777 |
| 6,661,847 B1 * | 12/2003 | Davis et al. | 375/242 |
| 6,721,357 B1 * | 4/2004 | Zhang et al. | 375/222 |
| 6,785,326 B1 * | 8/2004 | Tan | 375/222 |
| 2001/0038673 A1 * | 11/2001 | Olafsson | 375/354 |

* cited by examiner

*Primary Examiner*—Tesfaldet Bocure
(74) *Attorney, Agent, or Firm*—Abdul Zindani; W. James Brady III; Frederick J. Telecky, Jr.

(57) ABSTRACT

Disclosed are methods of selecting a multi-dimensional signal constellation in relation to impairments in a communication system having a data frame consisting of a fixed number of symbols. The methods make use of impairments detected from a Digital Impairment Learning sequence (DIL) and channel impairments, such as POE and SNR. Signal points are individually assigned to each symbol in a data frame in relation to that symbol's particular digital impairments and a pre-selected minimum performance level and maximum power constraints.

18 Claims, 2 Drawing Sheets

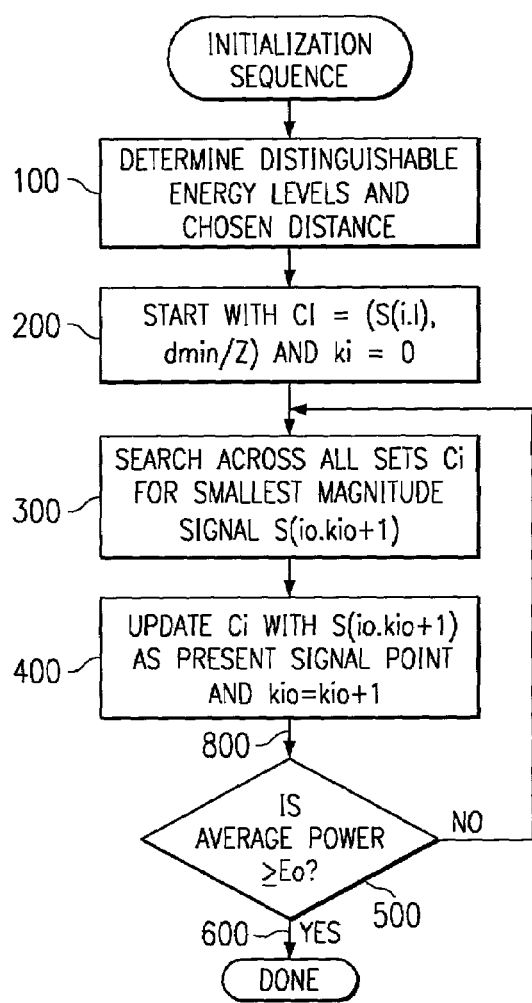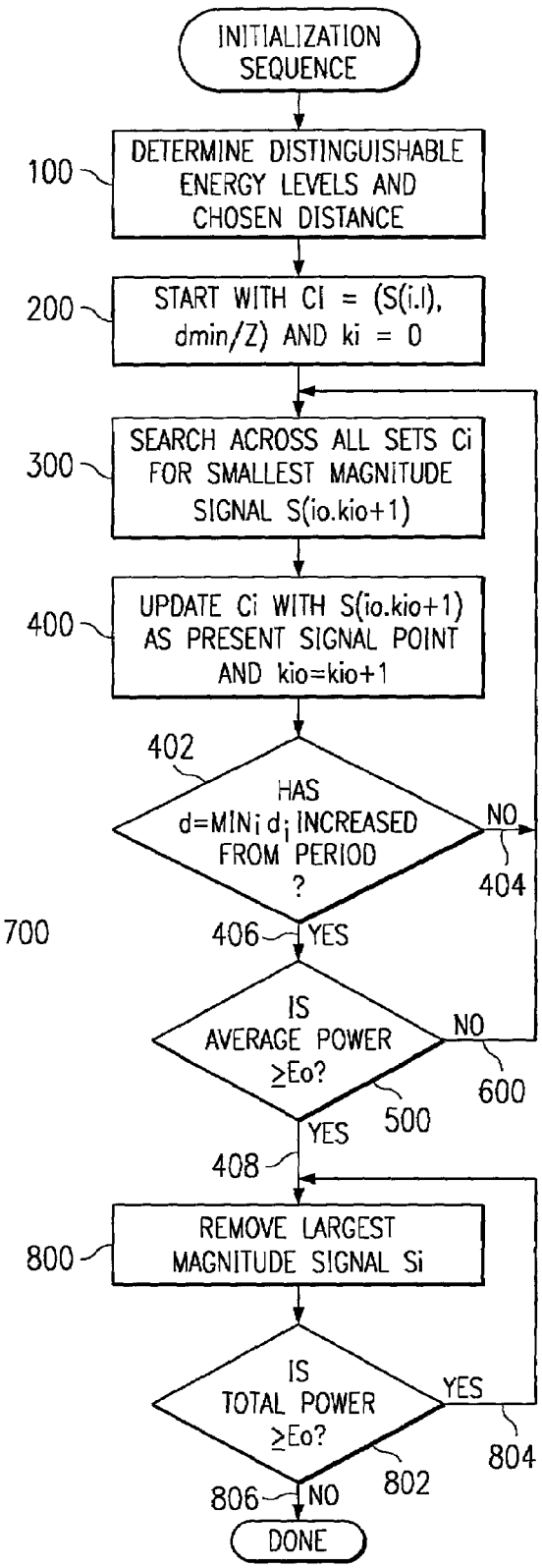

METHOD OF SELECTING A PCM MODEM SIGNAL CONSTELLATION IN RELATION TO CHANNEL IMPAIRMENTS

This application claims priority under 35 USC § 119(e)(1) of provisional application Ser. No. 60/279,864, filed Mar. 30, 2001.

TECHNICAL FIELD

This invention relates to PCM modems and, in particular, to dynamic signal constellation design for use with PCM modems. Additionally, the invention relates to assigning signal points for symbols within a signal data frame by adapting to impairments for individual symbols.

BACKGROUND OF THE INVENTION

It is well known in the arts to use Pulse Code Modulation (PCM) in transmitting digital signals with a digital modem downstream to a receiving modem. Using the V.90 standard, for example, a digital modem transmits a Digital Impairment Learning (DIL) sequence to an analog receiving modem. The analog modem uses the DIL sequence to determine the digital impairments present in the communication link, for example, Robbed Bit Signaling (RBS) and digital pads. Using this information, the analog modem then selects a signal constellation for continued downstream transmission from the sending modem. Due to the nature of the RBS impairment (periodic, repeating every sixth symbol), the V.90 standard defines a data frame to consist of six symbols. Each of the six symbols, according to the V.90 standard, potentially contains 256 PCM energy levels. In general, the six data frame symbols are affected differently by the digital impairments. However, it is common in the art to use one signal constellation for all of the six symbols. This generalization to a one-size-fits-all constellation limits system performance. An additional problem is posed by the existence of maximum power limitations which place a constraint on the total amount of energy that may be transmitted.

Accordingly, a need exists for a way of increasing performance and efficiency while maximizing the amount of information transmitted within a given power constraint. A method of dynamically selecting PCM signal constellations in relation to digital impairments, line conditions, performance requirements, and power constraints would provide numerous advantages.

SUMMARY OF THE INVENTION

It is an object of the present invention to provide a practical method for dynamic signal constellation design which provides a signal constellation having each symbol in a data frame individually designed according to its particular digital impairments. It is a further object of the invention to maximize data throughput by jointly designing the multiple symbols of the constellation in order to efficiently increase the amount of data that may be transmitted for a given maximum average power.

Disclosed are methods of selecting a signal constellation in relation to digital impairments in a communication system having a data frame consisting of a fixed number of symbols. The methods make use of digital impairments detected from a Digital Impairment Learning (DIL) sequence. Signal points are individually assigned to each symbol in a data frame in relation to the particular digital impairments for that symbol, a pre-selected minimum performance level, and maximum power constraint.

The invention disclosed provides many advantages by maximizing the data content of a signal constellation in view of the particular digital impairments and power constraints of the system.

Another technical advantage of the invention is achieved in the form of increased efficiency by monitoring the maximum signal power at preselected intervals, according to the desired power and performance level.

BRIEF DESCRIPTION OF THE DRAWINGS

In describing the features and advantages of the invention, reference is made to the following detailed description of the invention, taken in conjunction with the accompanying drawings of which:

FIG. 2 is a process flow diagram of the method for dynamically selecting a multi-dimensional signal constellation in relation to digital impairments;

FIG. 3 is a process flow diagram of the method of the example depicted in FIG. 2 including alternative steps for checking the maximum power constraints at intervals.

Corresponding numerals and symbols in the various figures refer to corresponding parts in the detailed description unless otherwise indicated.

DETAILED DESCRIPTION OF PREFERRED EMBODIMENTS

While the making and using of various embodiments of the present invention are discussed in detail below, it should be appreciated that the present invention provides inventive concepts which can be embodied in a wide variety of specific contexts. The specific embodiments discussed herein are merely illustrative of specific ways to make and use the invention, and do not delimit the scope of the invention.

In general, a constellation must be designed to satisfy fixed constraints, such as a maximum average power level and a desired performance level, generally expressed as an error rate or probability of error. Additionally, dynamic constraints such as digital impairments periodically affecting individual symbols, with a period greater than one, must be taken into account for each particular data transmission. A Digital Impairment Learning (DIL) sequence is used to identify digital impairments to each symbol.

Figure 1:
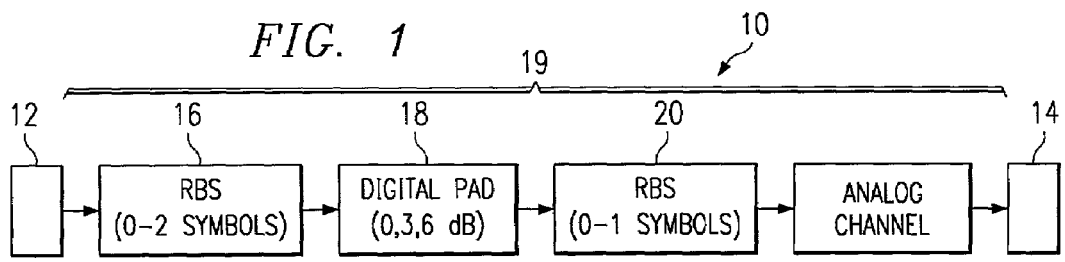
FIG. 1 depicts a typical impairment model for data transmission using the V.90 standard known in the art as an example of a system in which the invention may be practiced.

In this example of a preferred embodiment of the invention, the generally recognized standard known as V.90 is used for illustrative purposes. It should be understood that the invention may be used in the context of other standards. Referring to FIG. 1, the server modem 12 transmits a Digital Impairment Learning (DIL) sequence over a communication link 10 during startup. The client modem 14 uses this DIL sequence to learn the digital impairments present in the digital channel for the forthcoming data transmission, e.g. Robbed Bit Signaling (RBS) 16, 20 and digital pads 18. The receiving modem uses this digital impairment information in selecting a signal constellation for receiving downstream data from the server modem 12. Typically, the client modem 14 informs the server modem 12 of the desired signal constellation and the server modem 12 sends its data accordingly.

In this example of the signal constellation assignment method in a V.90 system, each data frame is composed of six symbols. Each of the six symbols has 256 possible energy levels known as Pulse Code Modulation (PCM) levels. Although the methods of the invention are described in terms of a sending modem and a receiving modem in this example, it should be understood that the invention may be practiced bidirectionally. That is, each modem could be both a sending modem and a receiving modem, and each of the modems could select a preferred signal constellation for receiving data from the other modem. An example of a bidirectional system standard, for example, is generally known as V.92. It should also be understood that the method of the invention may be practiced in systems having N symbols and M signal points where N and M are integers.

In order to provide a framework for more detailed discription, a general overview of the method of the invention is first provided as follows.

Given a desired performance level, for example, a probability of error and signal-to-noise ratio over the communications link 10 of FIG. 1, a chosen distance between signal points necessary for resolution of signal points can be determined. It will be apparent to those skilled in the arts that the transmission path may be a wireline, fiber optic cable, RF transmission, or any other communication link capable of carrying digital data. The signal-to-noise ratio over the transmission path is obtained from the initialization signals along with the digital impairment information. As part of the DIL sequence, the receiving modem receives the PCM levels in each of the symbols of the data frame. The receiving modem is then able to select which of the possible PCM levels are capable of carrying data. The present invention provides methods of advantageously selecting PCM levels in a way that achieves increased performance for a given power consumption. The receiving modem then lets the sending modem know which of the possible energy levels are available for use in transmission. It should be understood that the available PCM levels and the effect of the digital impairments may differ from symbol to symbol.

Having determined the available energy levels and chosen distance necessary for the client modem 14 to suitably distinguish between the available energy levels for each symbol, the available energy levels are distributed among signal points in the signal constellation by assigning signal points individually to each of the symbols in relation to the particular digital impairments for each symbol and the chosen distance between signal points.

Each symbol of the data frame is searched to identify the next smallest available energy level that is greater than or equal to the chosen distance for distinguishing between adjacent signal energy levels. It should be understood that the data frame consists of signal points above and below an origin or zero level. For convenience, only the positive side of the origin is described herein but it should be understood that a mirror image of the described portion of the constellation exists on the negative side of the origin.

As a result of searching each of the symbols in the data frame to identify the smallest available energy level that is greater than or equal to one half of the chosen distance from the origin, or the chosen distance from the negative of the energy level, a first signal point is assigned. The searching step is again performed for each symbol in the data frame, but after the first signal point has been assigned, the next smallest available energy level that is greater than or equal to the chosen distance from the previously assigned adjacent signal points is sought. When such an available energy level is identified, it is assigned as the next signal point in the data frame. The searching and assigning steps are thus continued as long as the average power of the data frame is less than the maximum average power value allowable for the transmission.

With the above general outline in mind, a more detailed description of the invention is now provided. An impairment model for data transmission using the V.90 standard for example, is shown in FIG. 1. A server modem 12, for example maintained by an Internet Service Provider (ISP), transmits data downstream to a client modem 14, which may be used by a subscriber to the ISP. The transmission takes the form of distinguishable PCM levels from among the 255 μ-law or A-law levels supported by the network codec. These levels are determined from a DIL sequence transmitted by the server modem 12 during startup. Typically, the first impairment 16 is Robbed Bit Signaling (RBS) on 0–2 data intervals, followed by a 0, 3 or 6 dB digital attenuation pad 18 and finally, another RBS impairment 20 on 0–1 data intervals. Of course, those skilled in the art will recognize that a similar transmission path may exist, as in V.92 for example, for transmission in the upstream direction. Channel impairments 19, expressed for example as a Signal-to-Noise Ratio (SNR), are incurred in the signal path.

In FIG. 2, a process flow diagram depicts the steps in the method of the invention for dynamically selecting a multi-dimensional signal constellation in relation to digital and channel impairments in a communications system. Beginning in step 100 with the DIL sequence, the distinguishable energy levels are determined. Additionally, from the desired performance level, typically expressed as a probability of error, and the Signal-to-Noise Ratio (SNR), the chosen distance between signal points, or minimum distance, $d_{min}$, (represented by reference numeral 46 in FIG. 4) is determined.

At step 200, a first signal point is assigned by selecting the lowest available energy level that is greater than one-half the minimum distance above the origin. In order to better illustrate the technique, let us define the set $C_i(S_{i,ki})=\{S_{i,ki+1}, d_{i,ik}\}$. Where $S_{i,ki}$ is the $k_i^{th}$ chosen signal point for symbol i, $S_{i,ki+1}$ is the $(k_{i+1})^{th}$ signal point for symbol i that is greater than or equal to a chosen distance, $d_{min}$, away from the signal point $S_{i,ki}$. The notation $d_{i,ki}$ is the actual distance between $S_{i,ki+1}$ and $S_{i,ki}$, which will always be greater than or equal to the chosen distance, $d_{min}$.

At step 300, the next signal point is selected by searching across all symbols for the next smallest available energy level that is greater than $d_{min}$ in distance above the previously selected signal point for the symbol. Completing the search across all the sets $C_i(S_{i,ik})=\{S_{i,ki+1}, d_i\}$, i=1, 2, . . . ,6 for the smallest magnitude signal point i.e., $i_o$=arg $min_i|S_{i,ki+1}|$; $S_{io,kio+1}$ becomes the next signal point in the 6-D signal constellation.

At step 400, the next available signal point is assigned. The set $C_{io}$ with $S_{io,kio+1}$ updated as the present signal point and $k_{io}$, the number of energy levels for symbol $i_o$, is incremented by 1.

The method proceeds to step 500 where it is determined whether the total average power is within the maximum power constraints. As shown by arrow 600, if the average power has reached the maximum average power value, then the constellation is finished. As shown by arrow 700, if the average power has not exceeded the allowable maximum power limit, the process of assigning additional signal points continues by repetition of steps 300 and 400.

The check to see if the maximum average power constraint has been exceeded may be performed by Equation 1 as follows:

$$\text{Average signal power} = \sum_{i=1}^{6} \sum_{j=1}^{M_j} p_{i,j} |S_{ij}|^2$$

where $M_i$ is the total number of signal points in the constellation for data interval i and $p_{i,j}$ is the probability that signal point $S_{i,j}$ is selected within the 6-D signal constellation.

It will be apparent to those skilled in the art that the check on average power constraints shown by arrow 800 can be performed at every signal point designation or preferably, at less frequent intervals in order to conserve computation effort.

An example of a preferred simplified method of checking the power is given by Equation 2: (This example assumes equally probably signal points.)

$$\text{Average signal power} \leq \frac{1}{6} \sum_{i=1}^{6} \frac{1}{M_i} \sum_{j=1}^{M_i} |S_{i,j}|^2$$

Implementation of the steps of the invention wherein average power constraints are checked at predetermined intervals according to the simplified technique is depicted in the process flow diagram of FIG. 3. Steps 100 through 400 are performed in the manner described above in reference to FIG. 2. Alternative to checking the power criterion at every iteration, it is preferred to check the average power bound specified in a simplification of the exact power calculation every time $\bar{d} = \min_i d_i$ increases over the current set of $C_i$s.

As seen in FIG. 3, in contrast to the embodiment described above with reference to FIG. 2, decision box 402 indicates that when a predetermined energy interval is reached, the average power is computed, as indicated by the path of arrow 404. If a predetermined energy level is not reached, then steps 300 and 400 continue, as indicated by arrow 404. As shown by arrow 406, when the new energy level is attained, the average power check is required at decision box 500 (as shown and described with reference to FIG. 2). When the average power does not exceed the maximum allowable power, then the process continues as indicated by arrow 600.

As indicated by arrow 408, where the average power limit is exceeded, then step 800 is performed where the highest-energy previously assigned signal point is removed. Thereafter, as shown at decision box 802, the exact total power constraint is checked. If the total power still exceeds the maximum allowable total power, as indicated by arrow 804, then the step of box 800 is again performed to remove the largest magnitude signal point. If the total power constraint is met, the constellation is finished as indicated by arrow path 806.

Figure 4:
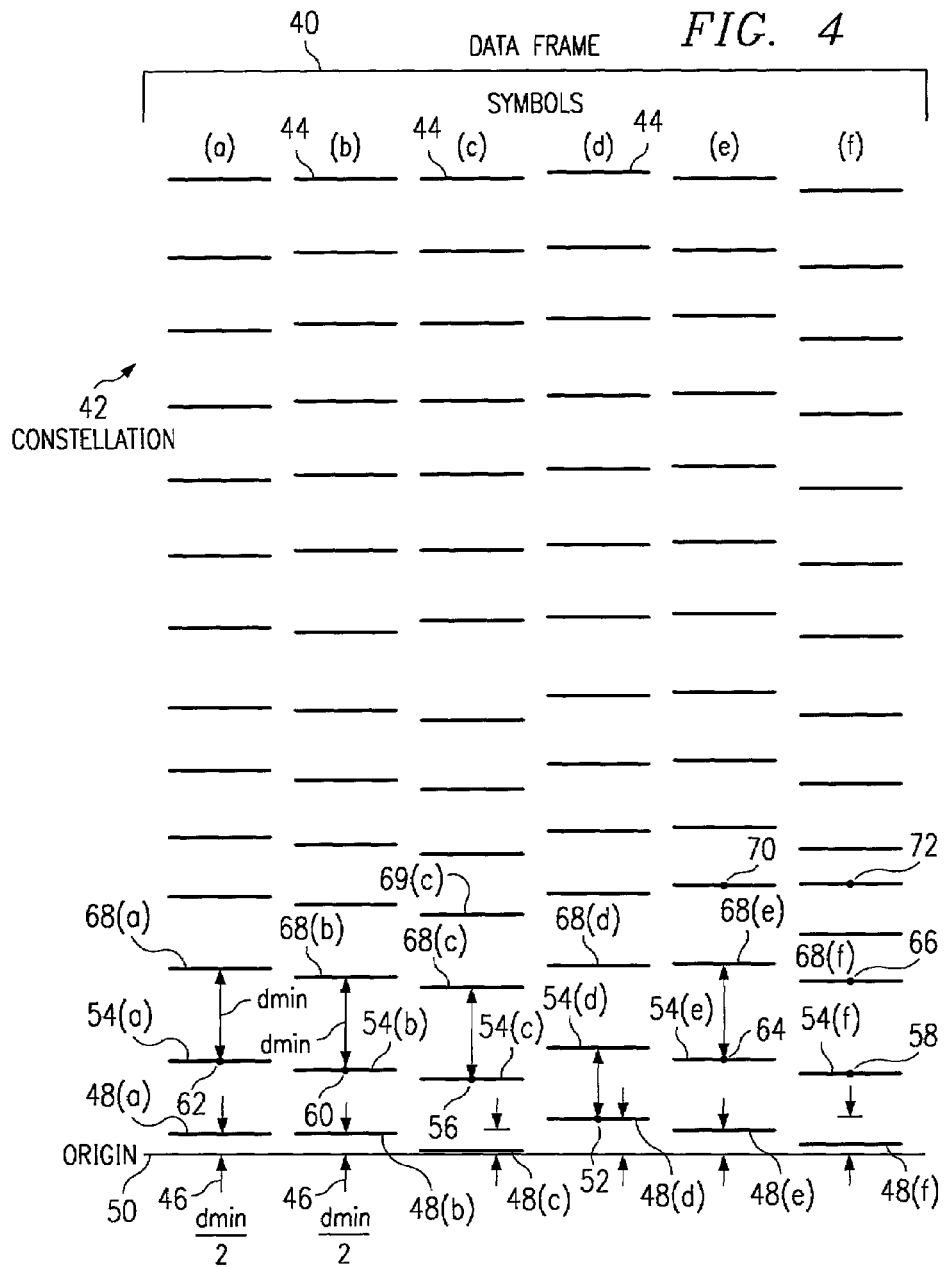
FIG. 4 is a graphical representation of a signal constellation designed in accordance with the methods of the invention.

FIG. 4 provides a graphical representation of the methods of the invention shown and described with reference to FIGS. 2 and 3. FIG. 4 represents an example of a data frame 40 in a constellation 42 made up of 6 symbols 44(*a–f*), according to the following steps. Having made a determination of the distinguishable energy levels, based on digital impairments to each of symbols 44(*a–f*), and a determination of $d_{min}$ based on channel impairments and desired performance, the first energy level 48(*a–f*) for each symbol 44(a-f) is evaluated to maintain at least the minimum distance 46 between signal points. Of course, the symbols 44(*a–f*) may be evaluated in any order. For the sake of this description, the individual symbols 44(*a–f*) will be described from left to right. It should also be apparent to those skilled in the art that although the present description includes only energy levels above the origin, a mirror image of selected energy levels would exist below the origin as well.

As can be seen with reference to FIG. 4, the first signal point in each symbol is assigned by searching across the symbols 44(*a–f*) to identify the lowest available energy level that is greater than one-half $d_{min}$ above the origin 50. For example, energy level 48(*a*) is less then one-half $d_{min}$ above the origin 50 and is not available for designation as a signal point. Likewise, energy level 48(*b*) can be seen to be less than one-half $d_{min}$ above the origin 50. Thus, for the first symbol 44(*a*), energy level 54(*a*) is the first available energy level and for second symbol 44(*b*), energy level 54(*b*) is the lowest available energy level for assignment as a signal point. It can be seen that for symbol 44(*c*), energy level 48(*c*) is well below one-half $d_{min}$ in distance from the origin 50 and is not available for assignment as a signal point. Accordingly, for symbol 44(*c*), energy level 54(*c*) is the lowest available energy level for assignment as a signal point. For symbol 44(*d*), energy level 48(*d*) is a distance greater than one-half $d_{min}$ above the origin 50 and is available for assignment as a signal point. Continuing to symbol 44(*e*), it can be seen that energy level 48(*e*) is unavailable for assignment as a signal point since it is less than one-half $d_{min}$ in distance from the origin 50. Thus, for symbol 44(*e*), energy level 54(*e*) is the lowest available energy level for assignment as a signal point. Finally, for symbol 44(*f*), energy level 48(*f*) is closer than one-half $d_{min}$ to the origin 50 and is unavailable for assignment as a signal point. The first available energy level for assignment as a signal point in symbol 44(*f*) is energy level 54(*f*).

From among the available energy levels thus identified, 54(*a*), 54(*b*), 54(*c*), 48(*d*), 54(*e*), and 54(*f*), the lowest is energy level 48(*d*). Accordingly, the first signal point 52 is assigned at energy level 48(*d*).

In the preceding paragraph, one-half $d_{min}$ from the origin was used to evaluate available energy levels. It should be understood that due to the symmetry of the signal constellation about the origin, this maintains a distance of $d_{min}$ or greater between each adjacent signal point in a particular symbol. The next signal point is assigned by searching across the symbols 44(*a–f*) to identify the next lowest available energy level that is greater than $d_{min}$ 46 above the previously assigned signal point in any given symbol 44(*a–f*).

Beginning at symbol 44(*a*), energy level 54(*a*) is seen to be greater than one-half $d_{min}$ above the origin and is thus eligible. At symbol 44(*b*), it is also seen that available energy level 54(*b*) is a potential signal point, being greater than one-half $d_{min}$ 46 above the origin 50. At symbol 44(*c*), it is seen that available energy level 54(*c*) is also greater than one-half $d_{min}$ 46 above the origin 50 and is a possible signal point. At symbol 44(*d*), it can be seen that the next available energy level 54(*d*) is less than $d_{min}$ 46 greater than the previously assigned signal point 52 and thus is not available for designation as a signal point. Accordingly, energy level 68(*d*) is seen to be a distance greater than $d_{min}$ above previously assigned signal point 52, and is available for assignment. At symbol 44(*e*), the next available energy level 54(*e*) is greater than one-half $d_{min}$ 46 above the origin 50 and may be considered for designation as a signal point. Finally, at symbol 44(f), the energy level 54(f) is again greater than one-half $d_{min}$ 46 above the origin 50, and is thus a potential signal point.

From among the available energy levels thus identified, 54(a), 54(b), 54(c), 68(d), 54(e), and 54(f), the lowest is energy level 54(c). Accordingly, the first signal point 56 is assigned at energy level 54(c).

Using the same techniques, the next smallest energy increase meeting the criteria for assignment as a signal point is energy level 54(f), which is assigned as the next signal point 58 in the constellation 42. It should be clear that repeating the same technique, the next assigned energy level is shown in FIG. 4 as signal point 60. It can also be seen that following the same procedure, signal points 62 and 64 would be assigned next.

The assignment of signal point 66 is briefly described in order to make clear the continuation of the assignment technique as the constellation signal points move away from the origin 50. For symbol 44(a), energy level 68(a) can be seen to be $d_{min}$ 46 above signal point 62. For symbol 44(b), it can also be seen that available energy level 68(b) is $d_{min}$ 46 above signal point 60. Thus, available energy levels 68(a) and 68(b) are possibilities for the next signal point. For symbol 44(c), it can be seen that next available energy level 68(c) is not $d_{min}$ 46 above previously assigned signal point 56, and thus is not suitable for assignment as the next signal point; accordingly, energy level 69(c) is considered. For symbol 44(d), the next available energy level 68(d) is greater than $d_{min}$ 46 from previously assigned signal point 52, and is thus available for assignment as a signal point. For symbol 44(e), the next available energy level 68(e) is $d_{min}$ 46 from signal point 64 and is also available for assignment as a signal point. In symbol 44(f), the next available energy level 68(f) is greater than $d_{min}$ 46 above previously assigned signal point 58 and is also at a lower energy level than available energy levels 68(a), 68(b), 69(c), 68(d) and 68(e), and is thus assigned as the next signal point 66 in the constellation 42.

It should be apparent that the same procedure applies for the assignment of signal points 70 and 72. It should be noted that signal points 70 and 72 each have the same energy level, but that they reside in different symbols, 44(e) and 44(f), respectively. Accordingly, it is immaterial to the total average power whether signal point 70 or signal point 72 is assigned first. However, in most cases, an increased data rate will be obtained by assigning the next signal point to the symbol having less previously assigned energy levels. In this example, symbol 44(e) has one signal point 64, and symbol 44(f) has two signal points, 58 and 66. Thus, in the present example, signal point 70, in symbol 44(e), would preferably be assigned first, then signal point 72 in symbol 44(f).

From the foregoing it should be clear to those skilled in the arts that the foregoing steps may be continued as long as the maximum power constraint is not reached and there are available signal points.

The embodiments shown and described above are only exemplary. Many details are often found in the art such as variations in digital protocols and standards. Therefore, many such details are neither shown nor described. It is not claimed that all of the details, parts, elements, or steps described and shown were invented herein. Even though numerous characteristics and advantages of the present inventions have been set forth in the foregoing description, together with details of the structure and function of the invention, the disclosure is illustrative only, and changes may be made in the detail, especially in matters of arrangement of the functional steps within the principles of the invention to the full extent indicated by the meaning of the terms used in the attached claims.

We claim:

1. A method for transmitting digital data within a communication system having a data frame defined to include a fixed number of symbols having a fixed number of specified possible energy levels, and a maximum average power value, the method comprising the steps of:
   (a) assembling a signal constellation by individually assigning signal points corresponding to each symbol in said data frame by the steps of:
      (i) computing a minimum distance required between symbol signal points to achieve a preselected performance level;
      (ii) receiving a Digital Impairment Learning (DIL) sequence;
      (iii) using said DIL sequence, identifying distinguishable energy levels from among said possible energy levels;
      (iv) searching each of said symbols in said data frame to identify the smallest available energy level greater than or equal to said minimum distance;
      (v) assigning as a first signal point, said smallest available energy level identified in step (a)(iv);
      (vi) searching each of said symbols in said data frame to identify the smallest available energy level greater than or equal to said minimum distance higher than a previously assigned signal point;
      (vii) assigning as a next signal point said smallest available energy level identified in step (a)(vi);
      (iix) while the average power is less than the maximum average power value and one or more of said available energy levels remain unassigned, repeating steps (a)(vi) and (a)(vii); and
   (b) transmitting digital data with said signal constellation.

2. The method of claim 1 wherein step (a)(iix) comprises computing said average power prior to assigning each of said signal points.

3. The method of claim 1 wherein step (a)(iix) comprises computing said average power at intervals and further comprising the step of:
   (a)(ix) performing steps (vi) and (vii) in reverse order until the average power is less than or equal to the maximum average power.

4. The method of claim 3 wherein said intervals are determined by the minimum distance of the immediately preceding signal point from the previous signal point energy level.

5. The method of claim 1 wherein said data frame comprises electrical signals.

6. The method of claim 1 wherein said data frame comprises light signals.

7. The method of claim 1 wherein said data frame comprises radio frequency signals.

8. The method of claim 1 wherein said data frame comprises six symbols.

9. The method of claim 1 wherein said fixed number of specified possible energy levels is 256.

10. The method of claim 1 wherein said method is practiced bidirectionally.

11. The method of claim 1 wherein said preselected performance level is expressed as an error probability of approximately 0.001.

12. The method of claim 1 wherein said communication system uses the transmission standard known as V.90.

13. The method of claim 1 wherein said communication system uses the transmission standard known as V.92.

14. A method according to claim 13, wherein the data frame comprises at least six symbols.

15. A method according to claim 13 wherein the symbols having at least 256 possible energy levels.

16. A method for dynamically selecting a multi-dimensional signal constellation for a data frame having a plurality of symbols, the symbols having a fixed number of specified possible energy levels and a maximum average power value, the method comprising:
- computing a minimum distance required between symbol signal points to achieve a preselected performance level;
- identifying a first smallest available energy level greater than or equal to said minimum distance;
- assigning the first smallest available energy level as a first signal point;
- searching each one of the plurality of symbols in the data frame to identify a next smallest available energy level greater than or equal to the minimum distance higher than a previously assigned signal point;
- assigning the next smallest available energy level as a next signal point;
- iteratively repeating the steps of searching, and assigning the next smallest available energy level while the average power is less than the maximum average power value and one or more of the available energy levels remain unassigned and transmitting digital data with said constellation.

17. A method according to claim 16, wherein the energy levels for symbols are identified using a Digital Impairment Learning (DIL) sequence.

18. A communication system for dynamically selecting a multi-dimensional signal constellation for a data frame having a plurality of symbols, the symbols having a fixed number of specified possible energy levels and a maximum average power value, the system comprising:
- means for computing a minimum distance required between symbol signal points to achieve a preselected performance level;
- means for identifying a first smallest available energy level greater than or equal to said minimum distance;
- means for assigning the first smallest available energy level as a first signal point;
- means for searching each one of the plurality of symbols in the data frame to identify a next smallest available energy level greater than or equal to the minimum distance higher than a previously assigned signal point;
- means for assigning the next smallest available energy level as a next signal point;
- means for iteratively repeating the steps of searching, and assigning the next smallest available energy level while the average power is less than the maximum average power value and one or more of the available energy levels remain unassigned and means for transmitting digital data with said constellation.

* * * * *